United States Patent
Pfaffelhuber

(10) Patent No.: US 10,077,085 B2
(45) Date of Patent: Sep. 18, 2018

(54) WHEEL AIR DAM WITH SOUND-ABSORBING MATERIAL

(71) Applicant: Röchling Automotive SE & Co. KG, Mannheim (DE)

(72) Inventor: Klaus Pfaffelhuber, Augsburg (DE)

(73) Assignee: RÖCHLING AUTOMOTIVE SE & CO. KG, Mannheim (DE)

(\*) Notice: Subject to any disclaimer, the term of this patent is extended or adjusted under 35 U.S.C. 154(b) by 28 days.

(21) Appl. No.: 15/363,411

(22) Filed: Nov. 29, 2016

(65) Prior Publication Data

US 2017/0151985 A1 Jun. 1, 2017

(30) Foreign Application Priority Data

Nov. 30, 2015 (DE) .................. 10 2015 223 771

(51) Int. Cl.
*B62D 35/02* (2006.01)
*B62D 27/02* (2006.01)
*B62D 29/04* (2006.01)
*B62D 25/18* (2006.01)

(52) U.S. Cl.
CPC ............. *B62D 35/02* (2013.01); *B62D 25/18* (2013.01); *B62D 27/02* (2013.01); *B62D 29/043* (2013.01); *B60Y 2306/09* (2013.01); *B60Y 2410/13* (2013.01)

(58) Field of Classification Search
CPC ...... B62D 35/00; B62D 35/022; B62D 25/16; B62D 25/18; B62D 35/02
USPC .................. 296/180.1–180.5, 217, 198, 120; 180/903
See application file for complete search history.

(56) References Cited

U.S. PATENT DOCUMENTS

| 4,778,212 | A  | * | 10/1988 | Tomforde | ............ | B62D 35/005 |
| | | | | | | 180/903 |
| 9,090,150 | B1 | * | 7/2015 | Krauss | ........................ | B60J 7/22 |
| 2005/0017541 | A1 | * | 1/2005 | Jungert | ................ | B62D 35/005 |
| | | | | | | 296/180.1 |
| 2015/0175222 | A1 | * | 6/2015 | Reuvekamp | ......... | B62D 35/005 |
| | | | | | | 296/180.1 |

\* cited by examiner

*Primary Examiner* — Dennis H Pedder
(74) *Attorney, Agent, or Firm* — Prince Lobel Tye LLP

(57) ABSTRACT

The present invention relates to a wheel air gap for a motor vehicle of which according to the invention at least one section of the wheel air gap open air comprises a sound-absorbing material.

11 Claims, 2 Drawing Sheets

WHEEL AIR DAM WITH SOUND-ABSORBING MATERIAL

CROSS REFERENCE TO RELATED APPLICATION(S)

Figure 1:
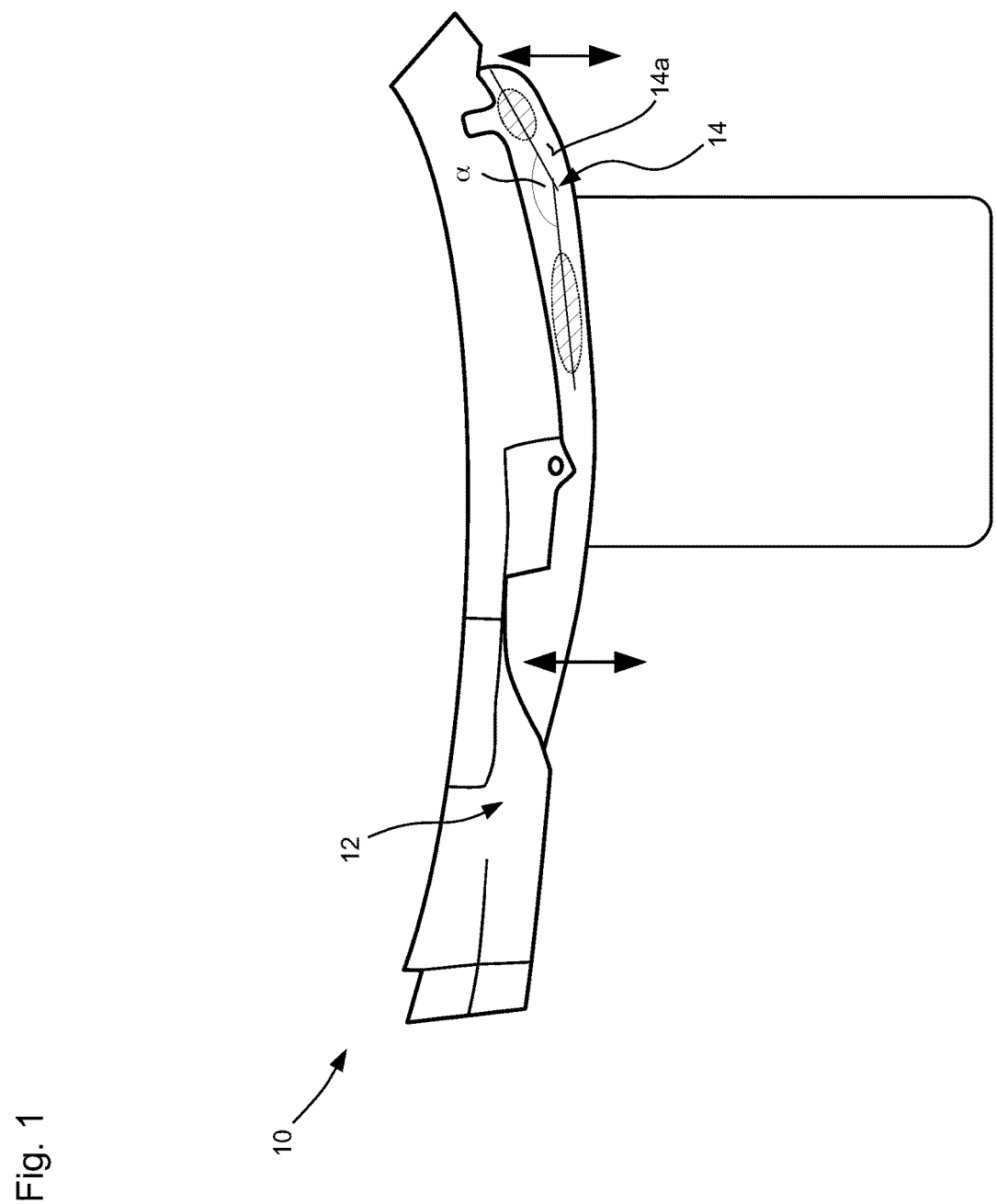

This application claims priority to German Application No. 10 2015 223 771.0, filed Nov. 30, 2015. The entirety of the disclosure of the above-referenced application is incorporated herein by reference.

BACKGROUND OF THE INVENTION

Field of the Invention

The present invention relates to a wheel air dam for a motor vehicle.

Such air dams are generally known on motor vehicles. They are generally installed in front of vehicle wheels in the forward driving direction in order to divert oncoming airflow away from the rotating wheels.

Airflow impacting rotating tires, in particular rotating front tires, on vehicles does not just increase the vehicle drag, which can also be verified by measurements of the particular Cv value, but also results in undesired noise production.

Wheel air dams therefore serve not only to increase the drag of a vehicle, or to reduce the deterioration of its drag at increasing driving speeds, but can also affect the noise emission of a vehicle.

SUMMARY OF THE INVENTION

In driving situations in which a vehicle fitted with wheel air dams bottoms out intensely, as when driving over a speedbump or a curbside, wheel air dams, of which usually at least a section extends or projects from the underbody to the vehicle footprint, thus as a rule toward the roadway, are subject to an increased risk of mechanical damage. Considering this damage risk, wheel air dams as a result are made with soft plastic, thus with a plastic with low modulus of elasticity, and with relatively small projection length from the underbody. Therefore wheel air dams were developed which are displaceably mounted on the underbody of a vehicle, and which at driving speeds of more than 60 km/h, with enlargement of the projection length of their flow control surface, extend toward the roadway. Even if the wheel air dams then fulfill their task of guiding the airflow away from the rotating wheels, they themselves as the driving speed increases, owing to the associated likewise increasing flow velocities of the oncoming airflow, form an aeroacoustic source.

It is therefore the task of the present invention to improve wheel air dams for motor vehicles in such a way that at a predetermined driving speed, especially at a predetermined high driving speed of more than 80 km/h, they emit less noise than wheel air dams of the prior art.

This task is accomplished according to the invention by a wheel air dam for a motor vehicle of which at least a section comprises a sound-absorbing material.

Hereby not every effect of reduction of sound intensity is designated as "sound-absorbing," as may be achieved in sound dampening, including through divergence. In this case sound-absorption should be understood to be transformation of sound energy into other energy forms, in particular heat.

Sound-absorbing materials can be porous materials and/or materials with, at least on one side, gas volumes closed off by a membrane. Based on the—in comparison with membrane-gas volume-materials—higher structural stiffness attainable with porous materials and the greater structural design flexibility, porous materials are here preferred as sound-absorbing.

Although open-celled foams, in particular hard foams as porous materials, are essentially suited for at least partial formation of wheel air dams, on the basis of stability and high acoustic efficiency, LWRT materials have proven to be especially suited porous materials. Therefore preferably at least one section of a wheel air dam according to the invention comprises an LWRT material. This is then the above-named sound-absorbing material.

The term "LWRT" stands for "Low Weight Reinforced Thermoplast" and designates a reinforced thermoplastic plastic with low weight or with low density. LWRT is a common technical term in the professional world, and designates a fiber composite made of thermoplastically bonded fibers. The fibers can be made from any desired material that has a higher melting or softening point than the material of the thermoplastic binder. The fiber material of an LWRT material can comprise glass fibers, mineral fibers, natural fibers, or even plastic fibers from a plastic with a higher melting or softening point than the thermoplastic binder plastic.

Depending on the operating conditions and requirements, the LWRT material can be compacted, wherein increasing compaction leads to decreasing porosity and to diminishing structural stiffness. Since LWRT material as a rule is made from a fiber mixture of permanent fibers and binder fibers, of which only the permanent fibers retain their shape, while the binder fibers are melted to produce thermoplastic binders of the permanent fibers, the LWRT material without compaction is very porous and can be used as an acoustically insulating material. The property of sound-absorption is not lost even with increasing compaction, as LWRT material can be significantly compacted without giving up its porosity completely. The sound-absorption is then to be differently assessed only if the LWRT material is completely compacted, thus if it forms a massive fiber-reinforced thermoplastic material without porosity. The present invention below uses the example of the use of porous LWRT materials. Nonetheless it should be clear that additionally or alternatively to the LWRT material described below, an open-celled foam material can be used.

With the at least partial use of LWRT material and/or foams for the formation of wheel air dams, can therefore, not only the sound-absorbing property of the material be advantageously used to reduce the sound omissions of the motor vehicle. In comparison with equally dimensioned massive wheel air dams, wheel air dams having at least in part LWRT material and/or foams are lighter and reduce the vehicle mass that has to be accelerated.

The sound-absorbing effect of the LWRT material in the wheel air dam can then be used to particular advantage when the LWRT material forms at least one section of an air dam surface exposed to the outside. Preferably the LWRT material forms a section of a surface of the air dame impacted by the airflow when moving forward, so that the sound-absorption of the LWRT material can act directly where the sound arises at the wheel air dam.

Here it is very advantageous that the pores of a porous material used as sound-absorbing are exposed on the side (dam side) impacted during operation of the air dam, so that the material can develop its acoustic efficiency especially well.

Usually the air dam has an attachment section designed for attachment to a motor vehicle, and a guide section designed to affect an air stream, thus in effect to divert the oncoming airflow. For the above reason, the LWRT material preferably forms at least a section of the guide section.

All the same, it cannot be ruled out that the LWRT material additionally or alternatively forms at least a part of the attachment section, as LWRT material also has excellent internal attenuation. Thus by means of at least partial formation of the attachment section from LWRT material, sound transmission from the wheel air dam to other areas of the vehicle carrying the air dam can be reduced or prevented.

According to a further advantageous embodiment, it can be considered that the guide section has a dam wall with a dam side, which with full installation of the air dam faces the front side of the vehicle, and with forward travel is impacted by the airflow, and with a shadow side opposite to the dame side, which with full installation of the air dam, faces the back of the vehicle, wherein at least the same side of the guide section is formed from LWRT material. As already described above, by formation of at least the dam side of the guide section from LWRT material, the sound-absorbing properties of the LWRT material can be efficiently used directly on the side where the oncoming airflow impacts the control section of the wheel air dam, as a possible specific sound source on the wheel air dam.

Preferably, for further improvement in reduction of the noise proceeding from the wheel air dam during operation, the entire surface of the guide section is made from LWRT material, so that also the shadow side of the guide section is formed from LWRT material. It is basically possible that the dam side and the shadow side of the guide section each is made of LWRT material and a carrier structure is provided between these two LWRT materials. However, it is preferred that the guide section be formed entirely from LWRT material. This saves weight in production of the wheel air dam, as in principle the guide section can be formed from only one layer of plate-shaped LWRT material. The one side of the plate-shaped LWRT material can then form the dam side and the opposite side can then form the shadow side.

More preferably, the wheel air dam can be made entirely from LWRT material in order to use as completely as possible the sound-absorbing properties arising from its porosity, and in order to use the internal attenuation of the LWRT material to avoid transmission of the sound arising on the wheel air dam during operation two further structures of the vehicle. In assessment of a wheel air dam made entirely from LWRT material, fastening materials inevitably made from some other material and the like such as clips, screws, and islets, should be ignored.

For a robust as possible design of a wheel air dam comprising LWRT material, the LWRT material preferably is provided as multilayer sandwich material. It can for example have an inner core layer made from thermoplastic three bonded fiber material and can have additional layers under its outer surfaces, as for example a protective nonwoven, in order to equip the section of the wheel air dam made from LWRT material to withstand stone impacts. Alternatively or in addition, the LWRT material outside or between the protective nonwoven and a layer made of thermoplastic. Bonded fiber material can have a protective film, possibly a polyolefin, in order to prevent out plaques of fibers from the bonded fiber material layer. A protective film provided on the dam side is perforated or micro-perforated in order to ensure the acoustic, sound-absorbing effectiveness of the porous material. A protective film provided on the shadow side can likewise be micro-perforated but need not be.

"Microperforation" comprises perforation openings with a diameter of up to 0.5 mm which pass completely through the perforated material in the direction of thickness.

Preferably the thermoplastic binder plastic, which is used to bind the fiber material, is a polyolefin, and among the polyolefins preferably poly propylene.

The LWRT core layer made of thermoplastic, the bonded fiber material, preferably has a surface weight of between 100 and 1500 $g/m^2$, preferably from around 800 to 1200 $g/m^2$, and most preferably of around 1000 $g/m^2$. The LWRT core layer can be composed of 2 to 5 but most preferably three partial core layers. The partial core layers can have different surface weights, wherein preferably those partial core layers lying further out have a lower surface weight than at least one partial core layer lying further towards the center (in the direction of thickness).

The above-named protective film preferably is made of polypropylene and has a surface weight of 150 to 300 $g/m^2$, preferably from between 190 and 260 $g/m^2$, and most preferably from around 230 $g/m^2$.

To further improve stiffness and strength of the wheel air dam, the LWRT material can have a metal layer, possibly aluminum foil. Preferably this metal layer is not entirely on the outside but lies at least under a plastic film such as the above described protective film, and/or under the above described protective nonwoven. The metal layer also is preferably microperforated for the above named reasons.

Preferably the layers of the multilayer LWRT sandwich material run parallel to the outer surfaces of the wheel air dam sections formed thereby.

A further advantage of LWRT material is that although it does exist as a played-shaped semifinished product, it can be forward in any other desired flat shape. Thus the LWRT material can form at least two, preferably more than two component surfaces enclosing an angle with one another, whereby a desired flow control, in particular of a guide section, can also be adjusted with plate-shaped LWRT material in a targeted manner. In the sense of the present invention, "component surfaces enclosing an angle with one another" are also understood to be those surface sections that are formed on a kink-free, bent component section in such a way that their tangent planes enclose an angle with one another.

The present invention also relates to a motor vehicle with a wheel air dam, as was described above, which is provided in the foreword driving position in front of the wheel of the motor vehicle on the underbody of the motor vehicle. Preferably there is a wheel air dam provided at least in front of each forward wheel of the motor vehicle.

The wheel air dam can be displaced relative to the underbody of the motor vehicle at least partially, in particular it can be lowered toward the footprint of the motor vehicle, and can be reached and lowered from the latter and disposed on the motor vehicle in order to change the flow control surface of the wheel air dam in a manner dependent on speed. And therefore in the case of implementation of a displaceable wheel air dam, at least the guide section is movable relative to the underbody of the motor vehicle, and in particular can be changed in its projection dimension from the underbody.

The wheel air dam can be designed in several parts, possibly with air dam components that are mobile relative to one another. This applies in particular to the guide section, which can be formed from several parts that are mobile with respect to one another.

BRIEF DESCRIPTION OF THE DRAWING FIGURES

Figure 2:
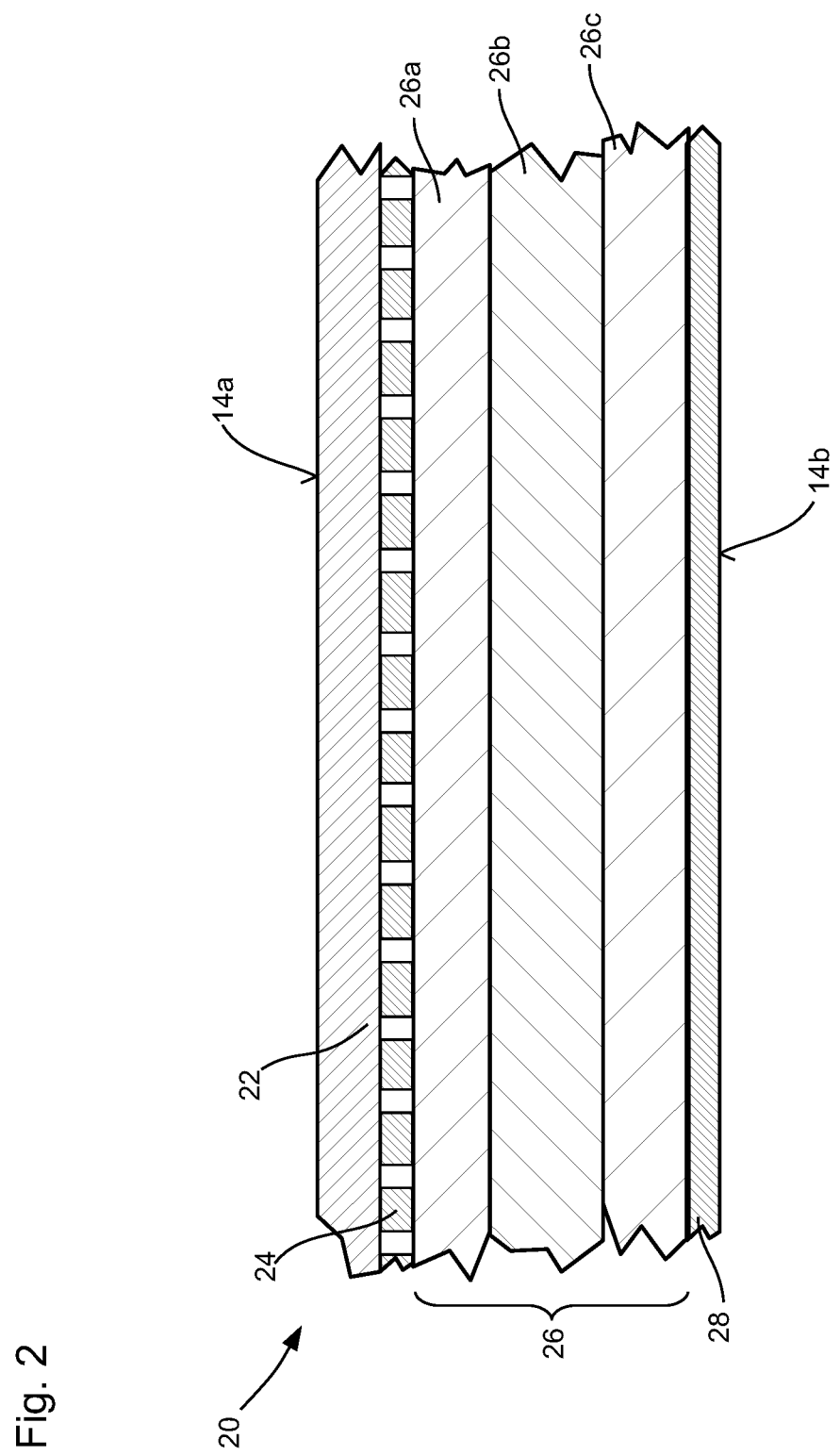

The present invention is explained in more detail below with reference to the attached drawings. These show:

FIG. 1 a perspective representation of an embodiment of a wheel air dam according to the invention and FIG. 2 a cross-section through an LWRT material, which can be used for example for sectional manufacture of the wheel air dam.

DETAILED DESCRIPTION OF THE PREFERRED EMBODIMENTS

FIG. 1 shows an embodiment according to the invention of a wheel air dam generally marked with 10. The wheel air dam 10 comprises an attachment section 12 for attachments to the vehicle and a guide section 14 projecting there from at an angle, possibly a right angle or an angle slightly less than 90°. The attachment section 12 is usually attached to the underbody of the motor vehicle, possibly by screws, and the guide section 14 is in front of the tire, in particular a front tire of the motor vehicle carrying the wheel air dam 10, in order to deflect the impacting airflow in the direction of the tire occurring during forward movement to the extent possible.

The airflow during forward movement of motor vehicle with a properly mounted wheel air dam impacts the dam side 14a of the guide section 14. Opposite this dam side 14a—facing away from the observer of FIG. 1 and therefore not discernible in FIG. 1—is the shadow side 14b of the guide section 14.

With a wheel air dam 10, which usually is designed in the prior art as an injection molded part, the sound energy emitted in the region of the tire by can be reduced by turning the airstream away from the particular tire.

For further reduction of the sound omission arising from the region of the vehicle tired during driving, according to the invention the wheel air dam 10 is made from a multilayer LWRT material. Preferably the wheel air dam 10 is made entirely from the LWRT material.

FIG. 2 shows an exemplary design of the LWRT material 240 forming the wheel air dam 10. The sectional view of FIG. 2 shows the LWRT material 20 from the dam side 14a (above) of the wheel air dam 10 as far as the shadow side 14b(below).

The dam side 14a which is outwardly exposed is preferably formed by a nonwoven layer 22, which offers good stone impact protection and on the basis of its porosity the possibility of sound-absorption.

Under the nonwoven layer 22 there can be provided a perforated door microperforated plastic film 24, possibly a polyolefins such as polypropylene or polyethylene. The plastic film 24 offers a barrier for the core layer 26 lying further thereunder and made of the thermoplastic bonded fiber material, preferably polyolefins bonded fiberglass material. The preferred binder plastic hereby is polypropylene.

The core layer 26 can be formed from several partial layers, in the exemplary embodiments shown from three partial layers 26a, 26b, and 26c. The partial layers 26a, 26b, and 26c can have different surface weights, wherein preferably the partial layers 26a and 26c lying further outward can have a smaller surface weight than the central partial layer 26b. With respect to the specific surface weight ranges of the core layer 26 is well as the other layers of the LWRT material 20, reference is made to the above description introduction.

The shadow side 14b of the guide section 14 can again be formed by a plastic film 28, which abuts the core layer 26. Plastic film 28 can be identical to the plastic film 24. Alternatively or additionally to the plastic film 28, the LWRT material 20 can also have a nonwoven layer on the shadow side 14b. Then the shadow side 14b is formed by the nonwoven layer.

Based on the porous structure of the LWRT material, the latter has excellent sound absorption properties. Due to the thermoplastic leave bonded fiber structure, the surface weight of the LWRT material is low while at the same time its strength is high, so that it is excellently suited for production of aerodynamically and possibly also mechanically loaded wheel air dams 10.

The invention claimed is:

1. A wheel air dam for a motor vehicle, wherein at least one exposed section of the wheel air dam that is impacted by airflow when moving forward, comprises LWRT as a sound-absorbing material.

2. The wheel air dam for a motor vehicle according to claim 1, wherein the sound-absorbing material forms at least one section of an exposed outward-facing surface of the wheel air dam.

3. The wheel air dam for a motor vehicle according to claim 1, wherein the wheel air dam has an attachment section designed for attachment to a motor vehicle and a guide section designed to influence an airstream, wherein the sound-absorbing material forms at least one section of the guide section.

4. The wheel air dam for a motor vehicle according to claim 3, wherein the guide section has a dam wall with a dam side, which when the wheel air dam is fully installed faces the front of the vehicle and during forward movement is impacted by the airflow, and with a shadow side opposite to the dam side, which when the wheel air dam is fully installed faces the rear of the vehicle, wherein at least the dam side of the guide section is made from the sound-absorbing material.

5. The wheel air dam for a motor vehicle according to claim 4, wherein also the shadow side is made from the sound-absorbing material.

6. The wheel air dam for a motor vehicle according to claim 1, wherein the wheel air dam is made completely from sound-absorbing material.

7. The wheel air dam for a motor vehicle according to claim 1, wherein the sound-absorbing material forms two component surfaces that enclose an angle with one another.

8. The wheel air dam for a motor vehicle according to claim 1, wherein the LWRT material is provided as a multilayer sandwich material.

9. A motor vehicle having a wheel air dam wherein at least one section of the wheel air dam comprises a sound-absorbing material, said wheel air dam being provided in the forward driving direction in front of the wheel of the motor vehicle on the underbody of the motor vehicle.

10. The motor vehicle according to claim 9, wherein the wheel air dam has an attachment section designed for attachment to a motor vehicle and a guide section designed to influence an airstream, wherein the sound-absorbing material forms at least one section of the guide section; and at least the guide section is movable relative to the underbody of the motor vehicle, and in particular can be changed in its projection dimension from the underbody.

11. The wheel air dam according to claim 1, wherein the sound-absorbing material forms more than two component surfaces that enclose an angle with one another.

* * * * *